United States Patent

[11] 3,580,269

[72] Inventors Henry Ehrens
  Bayside, N.Y.;
  Sidney Weiner, Cresskill, N.J.
[21] Appl. No. 820,207
[22] Filed Apr. 29, 1969
[45] Patented May 25, 1971
[73] Assignee Sealed Unit Parts Co., Inc.
  Allenwood, N.J.

[54] DEBRISLESS TAP VALVE WITH BACKRAKED PIERCING ELEMENT
  4 Claims, 5 Drawing Figs.
[52] U.S. Cl. .................................................. 137/318,
  72/325, 77/37, 83/660
[51] Int. Cl. .................................................. F16k 43/00,
  F16l 55/00
[50] Field of Search .......................................... 137/317,
  318; 77/37—42; 83/660; 72/325, 454, 476

[56] References Cited
UNITED STATES PATENTS
| | | | |
|---|---|---|---|
| 3,162,211 | 12/1964 | Barusch .................. | 137/318 |
| 3,495,615 | 2/1970 | Ehrens et al. ............. | 137/318 |

Primary Examiner—William F. O'Dea
Assistant Examiner—David R. Matthews
Attorney—Yuter and Fields ABSTRACT: A tap valve comprises a valve body having a portion to mate with a pipeline or container to be tapped. Within the body is a valve chamber having a passageway for communication with a fluid source or sink. There is also an opening in a mating face portion of the body for communication with the pipeline or container. A threaded passageway supports a valve stem member in the body which is floatingly coupled to a piercing element. The coupling is such that axial translational motion is transmitted by the stem member to the piercing element whereas the stem member is free to rotate with respect to the piercing element. The piercing element is a truncated cylinder with a backrake along its apex edge.

Patented May 25, 1971
3,580,269
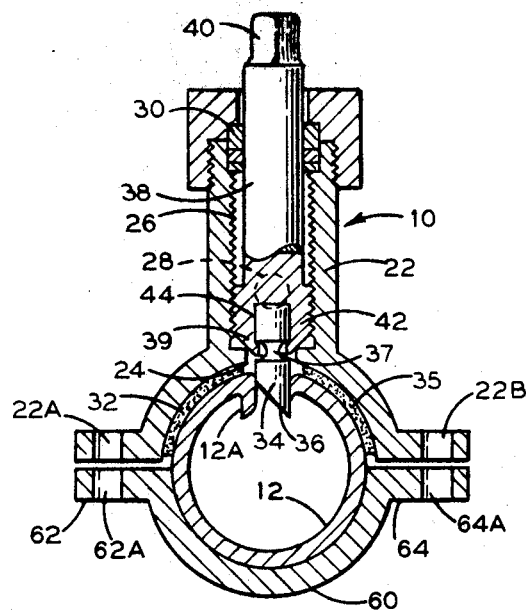
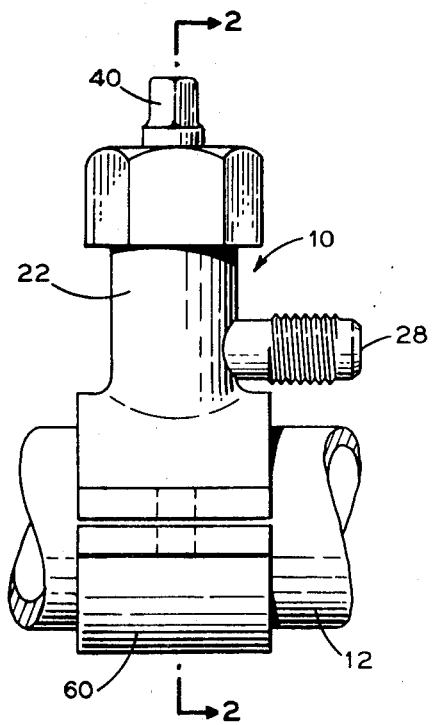
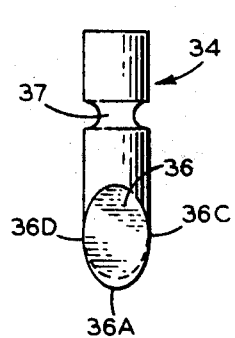
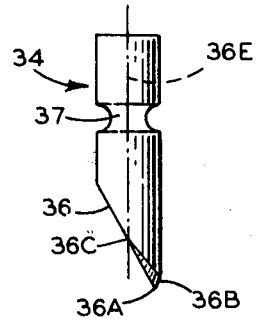
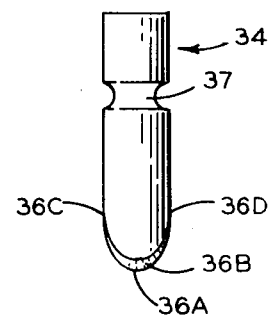
INVENTORS
Henry Ehrens
Sidney Weiner
BY Yuter & Spiecens
ATTORNEYS

DEBRISLESS TAP VALVE WITH BACKRAKED PIERCING ELEMENT

This invention pertains to tap valves, for use in tapping a pipeline or a container, generally to remove the fluid from the line or container to which it may be connected, or to inject a fluid into the line and its associated system.

In our U.S. Pat. No. 3,252,474, issued May 24, 1966, we disclosed an improved line tap valve. While that valve admirably performs its desired function with certain types of pipelines (particularly refrigerant lines using copper tubing) it created a demand for even more versatile line tap valves (particularly those that can be used with steel pipe and the like).

Lately, there has been a demand for tapping into pipeline so that preexisting pipelines can feed new fluid utilization devices. If it were possible to shut off the flow of fluid in the preexisting pipeline the tapping would present no problems. However, in many pipeline systems it is either inconvenient or prohibitively expensive to shut down the pipeline.

In our copending application Ser. No. 645,924 filed June 14, 1967 now U.S. Pat. No. 3,480,036 for Line Tap Valve and Method for Tapping Into a Pipeline, we disclosed a valve for satisfying this demand. While that valve satisfied its requirements it created a demand for an even better valve. In particular, the aforesaid valve required the predrilling of a starter hole in the pipeline. It is highly desirable for economic reasons to delete the predrilling step. In addition, many of the previously available tap valves caused debris, resulting from the creation of the tap, to fall in the pipeline. In high velocity narrow opening pipelines such debris can cause constrictions in the flow, blockage of fluid at inline valves downstream of the tap and other problems resulting from general debris in a pipeline.

Similar problems arise in the tapping of sealed containers. For example, there have become available throwaway containers of lightweight sheet steel carrying pressurized fluids such as refrigerants. Heretofore, these containers had one pound capacities. Larger capacity containers created problems. The standard tap valves could only produce small needlelike access ports in the containers. These small ports permitted reasonable outflow rates for small containers, but for large capacity containers (10 or more pounds) the flow rates required unusually long time periods to remove the fluid. Thus, for example, to charge a large refrigerating system with 10 or more pounds of refrigerant would require an unreasonably long time.

In our copending application Ser. No. 656,576, filed July 27, 1967 now U.S. Pat. No. 3,495,615, for Debrisless Tap Valve, we disclosed a valve which solved many of these problems. However, this disclosed valve caused a demand for a tap valve which could easily pierce heavier gauge pipes and containers.

It is accordingly, a general object of the invention to satisfy this demand.

It is another object of the invention to provide an improved tap valve which is more rugged than presently available tap valves.

It is a further object of the invention to provide an improved tap valve which easily pierces with a minimum of torque a relatively large hole in a fluid-carrying member with little danger of breaking the piercing element.

Briefly, the invention contemplates a tap valve for a fluid-carrying member such as a pipeline or a sealed container, comprising a valve body with an engaging face which is contoured to contact matingly a portion of the fluid-carrying member. There is a valve chamber in the body. A first passageway in the body provides access between the chamber and the outside of the body. An opening in the engaging face provides access between the valve chamber and the tap to be made in the fluid-carrying member. The valve body movably supports a valve stem member floatingly connected to a piercing element which passes through the opening in the engaging face. By a floating connection is meant a connection whereby only translational motion of the two connected members is coupled, whereas any rotational motion of the two connected members is coupled, whereas any rotational motion of one has no effect on the other. The piercing element is a truncated cylinder with a backrake along its apex edge.

Other objects, the features and advantages of the invention will be apparent from the following detailed description of the invention when read with the accompanying drawings which show by way of example and not limitation, the now preferred embodiment of the invention.

In the drawings:

FIG. 1 shows a side view of a tap valve connected to a pipeline in accordance with the invention;

FIG. 2 is a sectional view of the tap valve and pipeline taken along the line 2-2 of FIG. 1;

FIG. 3 is an enlarged front view of the piercing element of FIG. 2;

FIG. 4 is an enlarged side view of the piercing element of FIG. 2; and

FIG. 5 is an enlarged rear view of the piercing element of FIG. 2.

In FIG. 1, there is shown a tap valve used as line tap valve 10 connected to a pipeline 12. Before describing this fitting procedure, line tap valve 10 will be described by making reference to FIGS. 1 to 5. Valve 10 comprises a valve body 22 having a valve chamber 24, a tightly pitched valve-stem-supporting threaded passageway 26 and a fluid outlet passageway 28 communicating with valve chamber 24. Packing members 30 at the top end of passageway 26 provide a fluid seal. The bottom of valve body 22, as viewed in FIG. 2, is provided with a pipe-engaging face 32. Face 32 is contoured to mate with the outer wall of pipeline 12. Fixed to face 32 is a gasket 35 of resilient material to compensate for any mismating of the face 32 and the outer wall of pipeline 12.

The valve stem member 38 which has the function of driving pipe piercing tool or element 34 comprises: a wrench-receiving head 40; a threaded shaft 42 which meshes with valve-stem-supporting passageway 26 and a recess 44 having the shape of a cylinder to accept a portion of the element 34.

Element 34 (FIGS. 3 to 5) is cylindrical in shape having an outside diameter such that it is freely rotatable in recess 44. The cutting face 36 is preferably obtained by initially cutting the cylinder with a plane making an acute angle with the axis of the cylinder i.e., the cylinder is truncated. Thus, a wedge-shaped cutting tool is provided. While other shaped cutting faces can be used with soft pipelines made of copper, the wedge-shaped cutting face has many properties which are desirable for cutting steel pipe as will hereinafter become apparent. Since the cutting face is a wedge it should be apparent that the desired angle is obtained by trading off required applied force for cutting and travel distance.

In order to strengthen the cutting edge, the apex edge 36A of element 34 is provided with a backrake 36B so that the forward point of the apex edge 36A is not on the periphery of the cylinder. Preferably the backrake 36B starts at the forward point of the apex edge and taperingly extends therefrom in both directions along the edge to centerline points 36C and 36D on the edge of face 36. By centerline points is meant those two symmetrical points on the peripheral edge which are equidistant from the forward point of the apex edge and which project on the centerline or axis of the cylinder.

Because the element 34 also acts as the valving member, as will hereinafter become apparent, its axial travel must follow the axial travel of stem member 38. Accordingly, means must be provided to interengage element 34 and stem member 38 such that they can have free relative rotation but common axial translation. In FIGS. 2 and 3 this means is obtained by providing a peripheral groove near the top of element 34. After element 34 is placed in recess 44 of stem member 38, the peripheral edge 39 is rolled over to slidably fit in groove 37. Thus element 34 is freely rotatable with respect to stem member 38 and vice versa, while stem member 38 axially drives element 34. It should be noted that element 34 should bottom in recess 44 before edge 39 engages the wall of groove 37 during inward (downward() travel of stem member 38 in the cutting operation.

Although only one engaging means is shown in FIGS. 2 and 3, our previous cited application Ser. No. 656,576 now U.S. Pat. No. 3,495,615 shows other desirable engaging means.

The valve body 22 is mounted on pipeline 12 through the agency of strap 60. Strap 60 is preferably contoured to mate with pipeline 12. The ends 62 and 64 are flat and provided with holes 62A and 64A to mate with holes 22A and 22B in flattened portions of valve body 22. Bolts (not shown) pass through these holes to fix the valve 10 to the pipeline 12.

When line tap valve 10 is to be mounted on pipeline 12, valve stem member 38 is retracted so that piercing element 34 does not extend beyond the bottom of washer 35. A mechanic places face 32 of valve body 22 against pipeline 12 and aligns it at the desired position. Then strap 60 is connected onto valve body 22 by the nuts and bolts (not shown). The nuts are tightened so that gasket 12 seals the interface between the outer wall of pipeline 12 and the face 32 of valve body 22. A wrench (not shown) is applied to head 40 and valve stem 38 is propelled downward. As piercing element 34 is driven through the wall of pipeline 12 a shear and folding force is applied thereto, creating a flap 12A which is still integral with the pipeline. Consequently, no metallic debris enters the pipeline. It should be noted that when element 34 completely pierces the pipeline wall, the valve is closed.

When the valve is to be opened, valve stem 38 is retracted until element 34 is in valve chamber 24. At that time, there is unobstructed passage between pipeline 12 and passageway 28, via valve chamber 24.

It should be noted that element 34 and pipe line 12 cooperate to provide the valving seat. However, it is also possible to provide a separate valving seat in valve body 22.

It should be realized that the direction in which the flap 12A extends into the channel of the pipeline 12 is completely random. While this randomness is not deleterious in many applications, there are some instances where a minimum obstruction is required in the flow. In such cases the direction of the flap should be controlled so that its plane is parallel to fluid flow. Again, our previously cited application Ser. No. 656,576 now U.S. Pat. No. 3,495,615 teaches means whereby the flap is cut in a predetermined direction.

There has thus been shown an improved debrisless tap valve, ideally suited for use with heavy gauge pipelines or containers, wherein the use of a floating piercing tool with a backraked cutting edge permits the creation of a large outflow hole through the application of low torque and without the possibility of breaking the cutting edge.

While only one embodiment of the invention has been shown and described in detail, there will now be obvious to those skilled in the art many modifications and variations which satisfy many or all of the objects of the invention but which do not depart from the spirit thereof as defined by the appended claims.

We claim:

1. A tap valve for use with a fluid carrying member comprising a valve body having an engaging face provided with an opening and contoured to rest matingly with a portion of the fluid-carrying member and be connected thereto, a valve chamber in said body, a fluid passageway in said valve body communicating with said valve chamber, a valve stem member movably supported by said valve body, a piercing element passable through the opening in said engaging face, said piercing element having a backraked cutting edge and means for floatingly connecting said piercing element to said valve stem member whereby the movement of said valve stem member constrains only the axial movement of said piercing element.

2. The tap valve of claim 1 wherein said piercing element is in the form of a truncated cylinder.

3. The tap valve of claim 2 wherein said backrake is along the apex edge of said truncated cylinder.

4. The tap valve of claim 3 wherein said backrake starts at the forward point of the apex edge and taperingly extends in both directions therefrom to the centerline points of the apex edge.